Sept. 8, 1936.  L. H. McCLINTOCK  2,053,839
DECORATIVE ARTICLE
Filed July 30, 1935
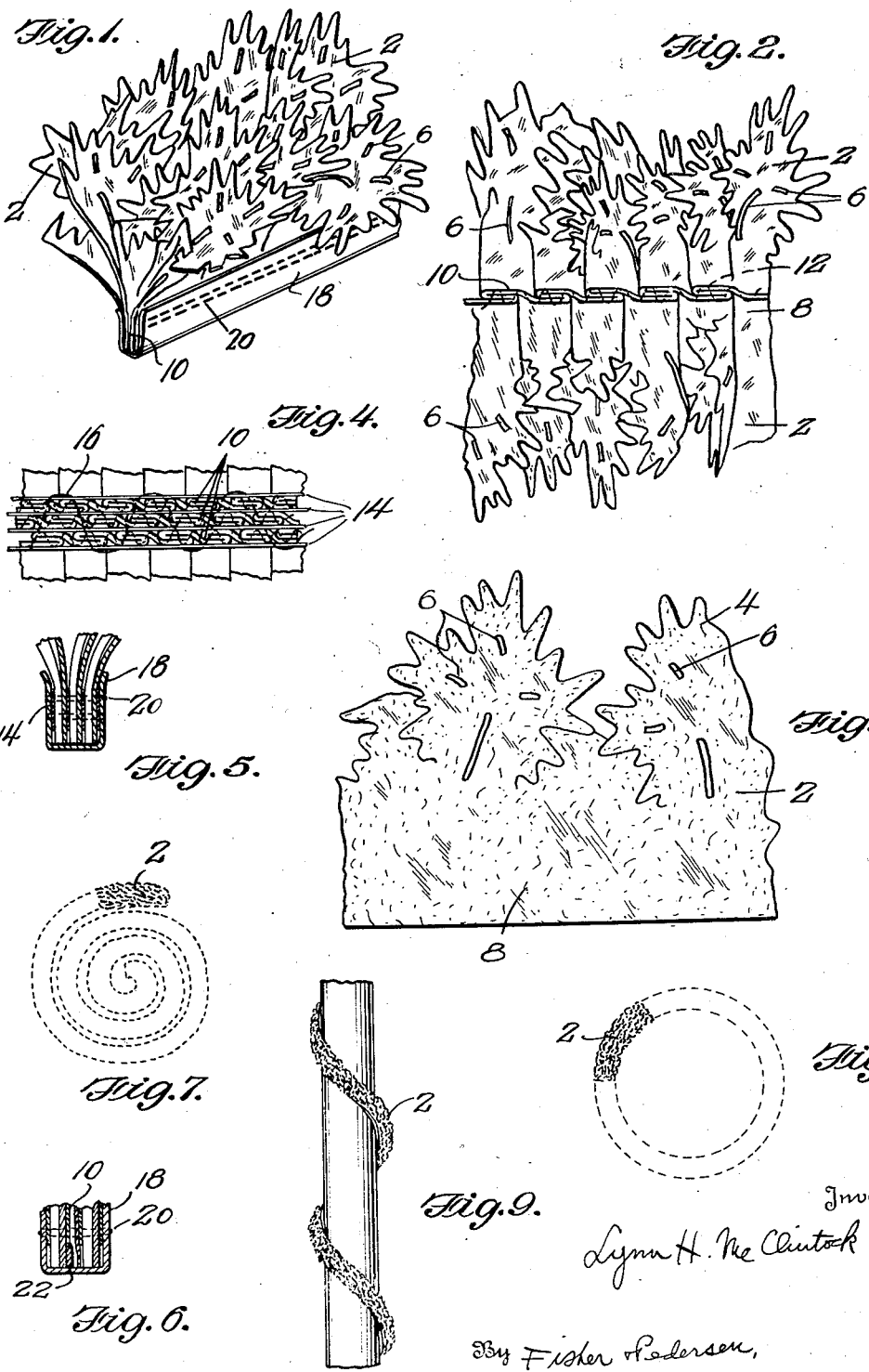

Patented Sept. 8, 1936

2,053,839

UNITED STATES PATENT OFFICE 2,053,839

DECORATIVE ARTICLE

Lynn H. McClintock, Los Angeles, Calif.

Application July 30, 1935, Serial No. 33,885

10 Claims. (Cl. 41—13)

This invention is a decorative article primarily intended for use on fruit stands and in meat markets, for simulating such greens as parsley, spinach, kale, etc., which are often used for decorating the shelves or stands on which vegetables and other groceries are commonly exhibited for sale. It constitutes an improvement over the article shown in my prior Patent No. 1,929,366, dated October 3, 1933.

According to the present invention, a plurality of "leaves", made preferably of flexible sheet material, such as green rubber, for example, have their lower edges assembled into overlapped bunched relation, preferably in several layers. Embracing the lower or built up or assembled edge of such leaves is a substantially U-shaped sheath or envelope made also of flexible material, such, for example, as rubber, the result of which is that the entire article is very freely bendable and flexible, thereby constituting an improvement over my prior patent.

In one aspect of the invention, a flexible plastic wire, preferably a pliable metallic wire, is associated with the assembled lower edge mentioned above, so that while the article is still quite freely flexible, it, by virtue of the pliable wire, will retain any shape into which it may be bent. It may be bent into various decorative forms, such as circles, spirals, helices, etc., and will retain such forms.

By virtue of the flexiblity of the article, a long strip may be wrapped around a post or standard in barber pole fashion; it may be formed into wreaths; it may form a background or edging of any desired shape simply by bending it to the proper shape. In case the pliable wire is not used, the flexible article will be held in desired shape simply by inserting it in between the fruit, for example, or other material with which it may be used on a display stand, as will be readily apparent.

As mentioned in my prior patent, the leaf simulating elements may be of green sheet rubber, preferably shiny on one side and dull on the other, and preferably provided with shiny areas, which will glisten and simulate drops of water.

The invention will be further described in connection with the present preferred embodiments thereof, as illustrated in the accompanying drawing, in which:

Figure 1 is a perspective view of the decorative article;

Figure 2 is a view of the article spread out to show certain constructional details;

Figure 3 is a fragmentary enlarged view of a detail;

Figure 4 is an enlarged sectional view taken on the line 4—4 of Fig. 1;

Figure 5 is a section on the line 5—5 of Fig. 4;

Figure 6 is a sectional view corresponding to Fig. 5, showing the use of a wire;

Figures 7, 8 and 9 are diagrammatic views showing several ways of using the invention.

Referring now to the drawing, in which similar reference characters indicate similar parts, a strip of green rubber or the like 2 has one edge cut, as shown at 4, to simulate leaves or greens, one side being preferably dull and the other side shiny and provided with bright areas 6 which will glisten like drops of water. The lower edge 8 of such a strip is then folded on itself to make folds 10, as in Fig. 2, and stitching or staples 12 are run through these folds to hold them in that position.

A plurality of such units, such for example, as three, shown in Fig. 4, are then assembled with the folded portions 10 against one another and the leaves in the same direction, preferably with interleaved strips of paper or the like 14 to permit ready penetration of the rubber by staples, stitches, etc. Ready penetration of the rubber by the staples, stitches, etc., is permitted due to the following:

When paper is punctured by a conical, pointed object such as a sewing machine needle, the paper first gives, forming a depression therein. Further penetration will break the walls of this depression, pushing the same aside at right angles to the plane of the paper, the same surrounding the needle shaft. This fact is utilized advantageously by the applicant in his structure in that the paper walls of the former depression, which surround the needle after puncture, extend into and through the rubber layers which, in turn, have been punctured by said same needle. The paper walls surrounding the needle which extend through the rubber layer will form a relatively non-frictional surface as compared to the rubber and the normal adhesion which would be encountered in sewing the rubber without utilizing the applicant's paper strip is either entirely or substantially eliminated. The laminated assembly of the three folded edges and the paper strips is then secured together in any suitable way, as by cementing, staples or the like, but preferably by stitching 16 going through all the layers.

An envelope or sheath of flexible material, such as rubber, shown at 18, is then bent around the assembled lower edge and secured in place, preferably by stitching 20 going entirely through the sheath or envelope 18 and the several lower edges 10. This sheath or envelope 18 could also be secured by cement or by staples, but I find stitching is quicker, reliable and convenient.

As shown in Fig. 6, a pliable wire or a flattened flexible strip 22 may, if desired, be placed in between the laminations, in such position as to clear the stitches 16 and 20. In this form the envelope 18 is used as before. The use of a pliable or plastic wire does not destroy the flexibility of the article, but gives it the property of maintaining any particular shape to which it may be bent.

As shown in Figs. 7, 8 and 9, the flexible article may be bent into various shapes, such as the helix of Fig. 7, the circle of Fig. 8, or the spiral of Fig. 9. It is, of course, obvious that it can be bent into any desirable shape at the option of the user.

In specifying the envelope of the applicant's device set forth in the claims as being "readily flexible", such term is meant to denote that degree of flexibility which would be present by way of example in a small rope of a diameter for instance of ¼ to ½ an inch.

While I have described the preferred embodiments of the invention in some detail, it should be understood that these details are illustrative but not restrictive of the invention, and that it may be carried out in other ways.

I claim as my invention:

1. A decorative article, comprising in combination a plurality of vegetation-simulating "leaves", having their lower edges assembled in overlapping bunched relation, and a substantially U-shaped, readily flexible envelope embracing said assembled edges, whereby the entire article is rendered readily flexible.

2. A decorative article, comprising in combination a plurality of vegetation-simulating "leaves", having their lower edges assembled in overlapping, bunched, elongated relation, a flexible wire associated with said assembled lower edges, and a substantially U-shaped, flexible envelope embracing said assembled lower edges and said wire.

3. A decorative article, comprising in combination a plurality of vegetation-simulating "leaves", having their lower edges assembled in overlapping, bunched, elongated relation, a flattened flexible strip associated with said assembled lower edges, and a substantially U-shaped flexible sheath embracing said assembled lower edges and said flattened strip.

4. A decorative article, comprising in combination a plurality of vegetation-simulating "leaves", the lower edges of which are gathered together into an elongated strip, and a readily flexible, substantially U-shaped envelope embracing said strip and secured thereto.

5. A decorative article, comprising in combination a plurality of vegetation-simulating "leaves", the lower edges of which are gathered together in overlapping, bunched relation, means for securing said assembled lower edges to each other, and a readily flexible, U-shaped envelope embracing said assembled lower edges and secured thereto.

6. A decorative article, comprising in combination a plurality of vegetation-simulating "leaves", the lower edges of which are gathered together in overlapping bunched relation in a plurality of layers to build up an edge of substantial thickness, securing means passing through the said several layers for holding them together, and a readily flexible, U-shaped envelope embracing said built-up lower edge and secured thereto.

7. A decorative article, comprising in combination a plurality of vegetation-simulating "leaves", the lower edges of which are gathered together in overlapping bunched relation in a plurality of layers to build up an edge of substantial thickness, securing means passing through the said several layers for holding them together, and a readily flexible, U-shaped envelope embracing said built-up lower edge and secured thereto by stitching passing through the envelope and through the several layers forming the built-up edge.

8. A decorative article, comprising in combination a plurality of vegetation-simulating "leaves", the lower edges of which are gathered together in overlapping, bunched relation in a plurality of layers to build up an edge of substantial thickness, stitching passing through the several layers for holding them together, and a readily flexible, U-shaped sheath embracing said built-up lower edge and secured thereto.

9. A decorative article, comprising in combination a plurality of vegetation-simulating "leaves", the lower edges of which are gathered together in overlapping, bunched relation in a plurality of layers to build up an edge of substantial thickness, stitching passing through the several layers for holding them together, a flexible wire strip associated with said built up edge, and a flexible, substantially U-shaped sheath or envelope embracing said built-up edge and said wire strip.

10. A decorative article, comprising in combination a plurality of vegetation-simulating "leaves", the lower edges of which are gathered together in overlapping, bunched relation in a plurality of layers, strips of paper interposed between the several layers, stitching means passing through the several layers and strips for holding them together, and a readily flexible, U-shaped sheath embracing said built-up lower edge and secured thereto said paper being adapted to serve as a non-frictional lining surface for said stitching in passing through said several layers.

LYNN H. McCLINTOCK.